United States Patent [19]

Schneider

[11] Patent Number: 4,790,078
[45] Date of Patent: Dec. 13, 1988

[54] MEASURING APPARATUS TO DETERMINE THE DIMENSIONS OF AN OBJECT IN THREE DIMENSIONS

[75] Inventor: Rudolf Schneider, Reinach, Switzerland

[73] Assignee: Erowa AG, Reinach, Switzerland

[21] Appl. No.: 7,465

[22] Filed: Jan. 28, 1987

[30] Foreign Application Priority Data

Dec. 9, 1986 [EP] European Pat. Off. ........ 86810675.8
Jan. 2, 1987 [DE] Fed. Rep. of Germany ....... 3700053

[51] Int. Cl.⁴ .............................................. G01B 5/02
[52] U.S. Cl. ....................................... 33/503; 33/1 M
[58] Field of Search ................ 33/503, 1 M, 556, 557, 33/558, 559, 560, 561, 549, 569, 568, 573, 570

[56] References Cited

U.S. PATENT DOCUMENTS

| | | | |
|---|---|---|---|
| 3,750,295 | 8/1973 | Nordmann et al. | 33/503 X |
| 4,155,173 | 5/1979 | Sprandel | 33/503 |
| 4,175,327 | 11/1979 | Herzog | 33/503 X |
| 4,483,079 | 11/1984 | Band et al. | 33/1 M |
| 4,630,381 | 12/1986 | Sakata et al. | 33/1 M |

*Primary Examiner*—William D. Martin, Jr.
*Attorney, Agent, or Firm*—Tarolli, Sundheim & Covell

[57] ABSTRACT

The measuring apparatus comprises a base plate member including a rotatable measuring object receiving station adapted to rotatably receive e.g. a tool to be measured. Besides the receiving station, a guiding column is arranged having a guiding rail along which a measuring carriage is movable upwardly and downwardly. The carriage is provided with a horizontally displaceable measuring rail, an end portion thereof being equipped with a measuring calliper assembly. This assembly includes a measuring calliper with a calliper head which may be brought into contact with the tool to be measured. The calliper head is displaceable with regard to a calliper portion fixed to the end portion of the measuring rail. A force acting on the calliper head in horizontal direction (e.g. towards the right) causes the same displacement of the calliper head as a force acting on the calliper head in vertical direction (e.g. upwardly). The displacement is determined by means of a measuring gauge. With the measuring apparatus of the invention, objects may be measured in three dimensions without the need to constructionally change or readjust the apparatus.

23 Claims, 7 Drawing Sheets

MEASURING APPARATUS TO DETERMINE THE DIMENSIONS OF AN OBJECT IN THREE DIMENSIONS

BACKGROUND OF THE INVENTION

1. Field of the Invention

The present invention relates to a measuring apparatus to determine the dimensions of an object in three dimensions, e.g. a tool used in a machining apparatus, an electrode of an electroerosive machining apparatus etc. The apparatus of the invention comprises a base plate member with a measuring object station adapted to fix an object to be measured such that it can be rotated but is immovable in radial and axial directions. Besides the object receiving station a measuring carriage assembly is mounted, including a guiding column and a measuring carriage slidable along the guiding column e.g. up and down. The measuring carriage incorporates a measuring rail slidably mounted in a direction perpendicular to the extension of the guiding column and bearing at one of its end a measuring calliper assembly.

2. Prior Art

In a known apparatus of this kind an object, e.g. a tool, is fixed in the object receiving station and the measuring carriage is moved along the guiding column into a suitable height position. Then the measuring rail is displaced towards the object to be measured until the sensing surface of the calliper head provided at the end of the measuring rail touches the object. The value of displacement of the measuring rail is recorded and therefrom a first dimension, e.g. a horizontally extending dimension, can be derived. To determine a second dimension, e.g. a horizontally extending dimension, the measuring rail is displaced towards the object to such an extent that it overlaps the object. Then the measuring carriage is lowered until another sensing surface of the calliper head touches the object again. The height position of the measuring carriage is recorded and therefrom said second dimension can be derived.

Because the moment at which the sensing surface of the calliper head touches the object can not be determined easily, or because an intuitive displacement of the measuring rail towards the object until the sensing surface of the calliper head touches the object would be much too inaccurate, it is well known to use calliper means, e.g. inform of measuring gauges, which record and display a contact with the object to be measured sufficiently accurately.

Already known measuring callipers work unidirectionally linear, i.e. a linear dimension variation in one given direction (and only in this direction) is proportionally transformed into a measurement value displayed by the measuring apparatus operatively coupled to the measuring calliper. Therefore, in order to determine the dimension or a dimensional divergence or a variation in dimension of a work piece in two different directions, either the utilized measuring apparatus including the measuring calliper had to be rearranged and readjusted again, or one had to utilize two measuring set-ups working independently from each other. Such proceeding resulted in an increased expenditure of working hours and/or financial investment.

OBJECTS OF THE INVENTION

It is an object of the present invention to avoid these disadvantages and to improve an apparatus of the kind referred to above such that it can be used more efficiently and more universally than known apparatus of the prior art.

It is a further object of the invention to provide a measuring apparatus of the kind referred to above which allows to determine the dimensions of an object in a plurality of different directions without the need to rearrange or readjust the measuring apparatus or the calliper assembly thereof.

It a still further object of the invention to provide a measuring apparatus of the kind referred to above which is of compact design and can be manufactured at a reasonably low price, yet is very precise and reliable.

It is a still further object of the invention to provide a measuring apparatus by means of which deviations of dimensions of an object with regard to known standard dimensions, rotational accuracy of rotating tools and the position of an object relative to a reference position can easily and quickly determined.

SUMMARY OF THE INVENTION

The aforementioned and other objects are met with a measuring apparatus to determine the dimensions of an object in three dimensions comprising a base plate member and object receiving means mounted on the base plate member adapted to rotatably but axially and radially immovably fix an object to be measured. A measuring carriage assembly is mounted on the base plate member distantly to the object receiving means and includes a guiding column projecting from the base plate member and extending in a first direction, and a measuring carriage slidably mounted on the guiding column to be movable along the guiding column. A measuring rail is slidably mounted on the measuring carriage to be movable in a second direction perpendicular to the aforementioned first direction.

First driving means are provided on the guiding column to drive the measuring carriage to a movement along the guiding column in the aforementioned first direction, and second driving means are provided on the measuring carriage to drive the guiding rail to a linear movement in the aforementioned second direction;

The measuring apparatus further comprises measuring calliper means mounted on the measuring rail at one end thereof, and locking means provided on the measuring carriage to lock the movement of the measuring carriage along the guiding column and to fix the measuring carriage in an arbitrary position on the guiding column.

The first and second driving means each comprise a rotatable driving member, a reversing gear assembly coaxially mounted and operatively coupled to the driving member, and a driven member coaxially mounted and operatively coupled to the reversing gear assembly to drive the driven member to a first speed. Furthermore, more, the first and second driving means each comprise auxiliary driving member means engagable with the driven member to directly drive the driven member to a second speed lower than said first speed.

The measuring calliper means used in the apparatus according to the present invention comprise a measuring calliper with a calliper body and a calliper head mounted on the calliper body and displaceable with regard to the calliper body. For this purpose, connecting means are provided connecting the calliper head to the calliper body such that any constant measuring force acting on the calliper head in an arbitrary direction between and including the aforementioned first and second directions results in a certain displacement of the calliper head with regard to the calliper body which always shows identical value and direction. To recognize such displacement, the measuring calliper means further includes position detecting means to display the position of the calliper head with regard to the calliper body.

The advantages offered by the measuring apparatus according to the invention are manifold: Particularly objects which are symmetrical with regard to a central axis of rotation may be measured from all sides quickly, precisely but nevertheless sensitively; the measuring rail being in a locked state renders the apparatus very suitable to easily measure the rotational accuracy of e.g. rotating tools or the variance of the shape of multidimensional objects; all measurements having an arbitrary measuring direction within a sector of 90° may be performed without any rearrangement or readjustment of the apparatus.

BRIEF DESCRIPTION OF THE DRAWINGS

In the following, an embodiment of the apparatus according to the invention will be further described by way of example, with reference to the accompanying drawings, in which.

DESCRIPTION OF A PREFERRED EMBODIMENT

The measuring apparatus shown in FIGS. 1 to 4 comprises a base plate member 1 preferably in the form of a rigid cast iron body and comprising two exactly flat, plainly machined surface areas 2 and 3 which lie in the same plane. A measuring carriage device, generally designated with reference numeral 4, is attached, e.g. bolted, to said plainly machined surface area 2; the design of the measuring carriage device 4 will be explained in more detail hereinafter. The base plate member 1 is equipped with a measuring object receiving means, generally designated with reference numeral 5, which is embedded in said plainly machined surface area 3 of the base plate member 1. The measuring object receiving means 5 include a generally cylindrical sleeve 6 which has a centrically arranged conical bore 7 adapted to clampingly receive an object to be measured. The sleeve 6 is open at its top, and the shape and size of the bore 7 is such that it corresponds to the shape and size of a standardized tool shaft in order to enable a tool which must be measured to be directly inserted into the measuring object receiving means 5. The sleeve 6 is rotatably supported without clearance in a recess 12 of the base plate member 1 by means of two ball bearings 8 and 9 mounted distantly to each other whereby the upper ball bearing 8 is covered by an annular cover member 10 which has a central opening 11 through which the sleeve 6 projects outwardly. If appropriate, a sealing member of a suitable kind (not shown) can be inserted between the edge of the opening 11 and the surface of the sleeve 6.

Figures 1, 1A, 1B, 1C:
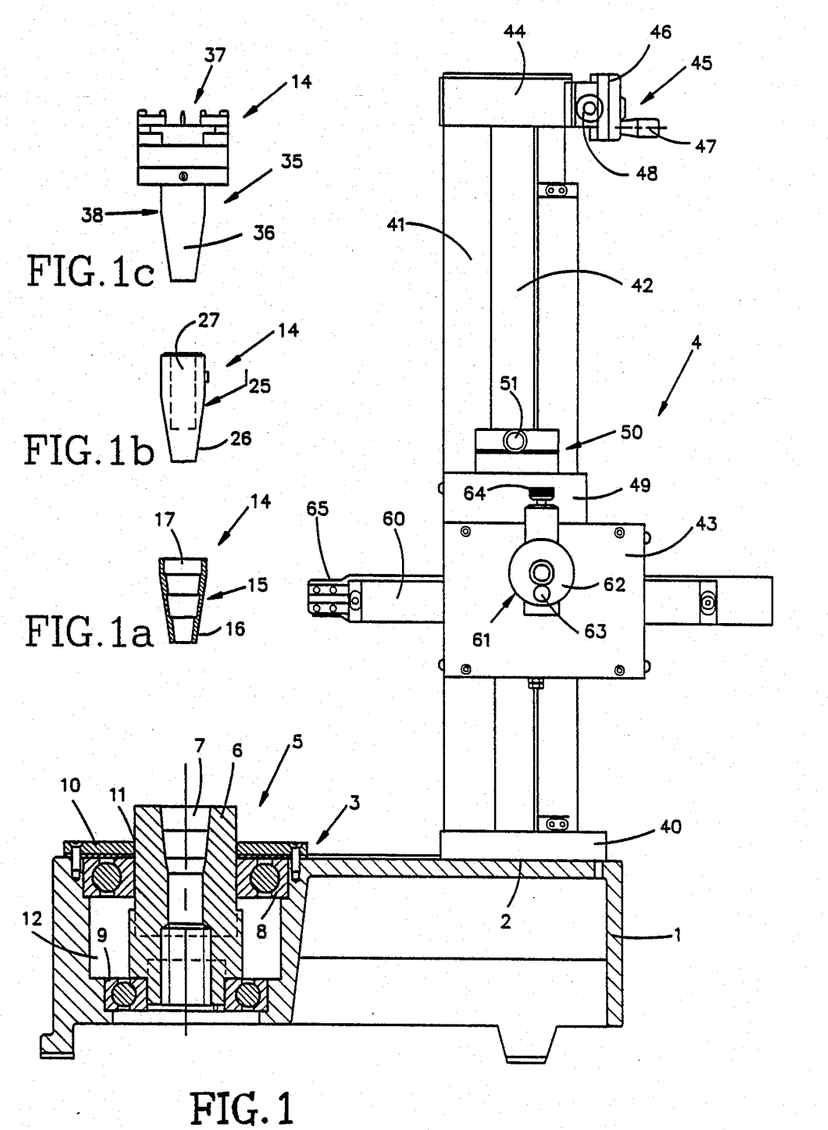
FIG. 1 shows a schematic front view of the measuring apparatus according to the invention, the base plate being shown in a sectional view.
FIGS. 1a to 1c show three different examples of inserts for the measuring object receiving means.

If the object to be measured does not dispose of a conical shaft which could be directly and fittingly inserted into the receiving bore 7 of the sleeve 6, adapter members 14 are provided, some examples thereof being shown in FIGS. 1a to 1c.

Accordingly, FIG. 1a shows a cross section of a reduction adapter member 15 comprising a surface area 16 which corresponds exactly to the receiving bore 7 of the sleeve 6 with regard to shape and dimensions. Thus, it can be inserted directly and fittingly into the receiving bore 7 of the sleeve 6. The reduction adapter member 15 comprises a conical receiving bore 17 with smaller dimensions, for instance to receive a tool to be measured which has an acutely conical shaft.

In FIG. 1b, there is shown a schematic side view of an e.g. hydraulically operated chuck 25 comprising a surface area 26 which corresponds exactly to the receiving bore 7 of the sleeve 6 with regard to shape and dimensions. Thus, it can be inserted directly and fittingly into the receiving bore 7 of the sleeve 6. The chuck 25 is provided with an e.g. cylindric receiving bore 27 adapted to receive tools or other objects to be measured which dispose of a cylindric shaft.

FIG. 1c shows a schematic side view of a clamping and centering element 35, the head 37 thereof cooperating with a (not shown) counterpart member to which the object to be measured is fixed. Such clamping and centering elements are used, for instance, as higly precisely operating rapid coupling devices for electrodes in electroerosive machining apparatus. The clamping and centering element 35 comprises a shaft 38 with a surface area 36 which corresponds exactly to the receiving bore 7 of the sleeve 6 with regard to shape and dimensions. Thus the clamping and centering element 35 can be inserted directly and fittingly into the receiving bore 7 of the sleeve 6.

It is understood that the adapter members 14 shown in FIGS. 1a to 1c and hereinbefore described represent but a few examples. It depends of the actual facts and of the shape and size of the object to be measured whether an adapter member 14 is required and, if so, how such adapter member is to be designed. Alternatively, the rotating sleeve 6 may be provided with other suitable clamping means instead of the conical receiving bore 7. It is only essential that the sleeve 6 be rotatably received in the base plate member 1 without clearance in radial and axial directions, and that the sleeve 6 is able to immovably fix an object to be measured.

The measuring carriage device 4 generally includes a mounting plate 40 which is bolted or otherwise fixedly connected to the base plate member 1 in the region of its plainly machined surface area 2. A guiding column 41 is mounted on the mounting plate in such a way that the column 41 extends exactly perpendicularly to the plainly machined surface area 2 of the base plate member 1. The guiding column 41 is provided with a guiding rail 42, and a measuring carriage 43 is slidably mounted on the guiding rail 42 such that it can travel upwardly and downwardly. Preferably, linear ball bearing means are provided to slidably mount the carriage 43 on the rail 42, such linear ball bearings being known in the art and comprising a plurality of balls engaging V-shaped grooves provided along two opposite edges of the guiding rail 42 and rolling off in the grooves upon movement of the carriage 43. The linear bearings of this kind provide for a very precise, essentially clearance-free supporting of a sliding carriage and require little or nearly no servicing.

To drive the measuring carriage 43 along the guiding rail 42, the guiding column 41 comprises a column head 44 incorporating a driving means 45 for adjusting the height position of the carriage 43. The driving means 45 includes a driving wheel 46 with an eccentrically mounted driving pin 47. Upon rotation of the driving wheel 46, the carriage 43 is moved along the guiding column 41 with a first, higher speed. The driving means 45 further includes an auxiliary driving wheel 48 which may be actuated, if necessary, to move the carriage 43 along the guiding column 41 with a second, lower speed. The first, higher speed serves to coarsly move the carriage 43 close to a desired height position along the column 41, and the second, lower speed serves to finely position the carriage 43 in the desired height. The design and the construction of the driving means 45 will be fully explained later with reference to FIG. 7.

The measuring carriage 43 is provided with a locking means 50 mounted on the carriage housing 49 and cooperating with the guiding rail 42. The locking means 50 may be actuated by means of a actuating knob 51 and serves to immovably fix the carriage 43 with regard to its height position along the guiding column 41. The design and construction of the locking means 50 will be fully explained later with reference to FIGS. 8, 9, 10 and 11.

The measuring carriage 43 is further provided with a measuring rail 60 which is, in the present example, slidably mounted in horizontal direction, i.e. to the left and to the right. Anyhow the moving direction of the measuring rail 60 extends exactly perpendicular to the moving direction of the measuring carriage 43. Preferably the mounting and guiding of the measuring rail 60 may be realized with linear ball bearing means again, as previously explained, to ensure an essentially friction-free, precise displacement of the measuring rail 60.

To drive the measuring rail 60 with regard to the carriage 43, a driving means 61 similar to the driving means 45 is provided, with a driving wheel 62 having an eccentrically mounted driving pin 63 to drive the measuring rail 60 with a first, higher speed, and with an auxiliary driving wheel 64 to drive the measuring rail 60 with a second, lower speed.

One end 65 of the measuring rail 60, i.e. the end directed towards the measuring object receiving means 5, is adapted and prepared to receive a measuring calliper means; the latter one will be fully described hereinafter. Finally, the measuring carriage 43 may be provided with a locking means (not shown) similar to the locking means 50 mentioned hereinbefore, serving to lock the measuring rail 60 with regard to a movement in horizontal direction.

Figure 2:
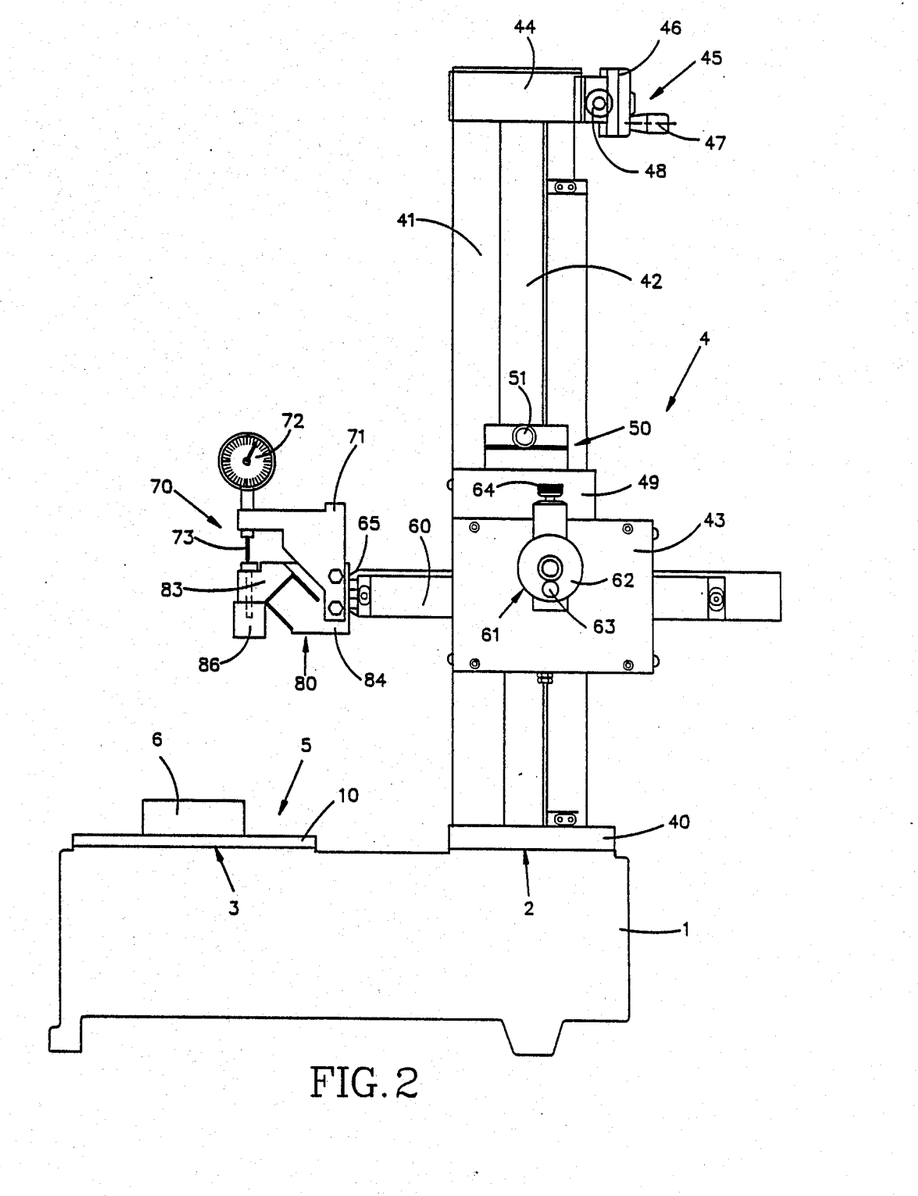
FIG. 2 shows a schematic front view of the measuring apparatus according to the invention without a measuring object inserted into the measuring object receiving means, in a rest position.

As can be seen from FIG. 2, the end portion 65 of the measuring rail 60 is provided with a measuring calliper means generally designated by reference numeral 70. The measuring calliper means 70 includes a measuring calliper 80 which will be further explained hereinafter with reference to FIGS. 5 and 6, as well as a support 71 rigidly fixed to the measuring rail 60 and serving to support a measuring gauge 72 of known design. The measuring calliper includes a rigid portion 84 fixedly connected to the end portion 65 of the measuring rail 60 and a movable portion 83 bearing a calliper head 86. The stylus 73 of the measuring gauge 71 rests on the movable portion 83 such that the measuring gauge indicates the amount of any displacement of the movable portion 83 with regard to the rigid portion 84.

Figure 5:
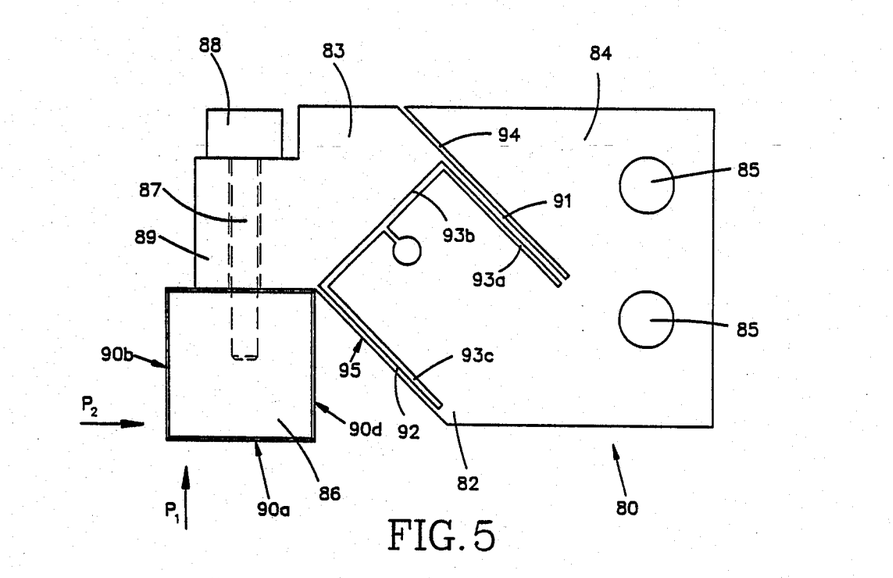
FIG. 5 shows an enlarged side view of the measuring calliper used in the measuring apparatus according to the invention, in a rest position.

The general design of the measuring calliper 80 may be recognized in FIG. 5. In the present example, it comprises a calliper body 82 which is subdivided, as already mentioned, into a first movable portion 83 and a second rigid portion 84. The said two portions are displaceable with reference to each other as will be further explained hereinbelow.

The second portion 84 comprises two mounting bores 85 which serve to fix the portion 84 of the calliper body 82 to the end portion 65 of the measuring rail 60.

The first portion 83 is displaceably connected to the second portion 84 and comprises a calliper head 86 which is, in the present example, rigidly secured to an extension 89 of the first portion 83 of the calliper body 82 by means of a screw 87. The calliper head 86 has the shape of a hexaedral body comprising at least two measuring surfaces 90a and 90b. These measuring surfaces are plainly machined and extend at an angle of exactly 90° with reference to the two adjacent measuring surfaces. Depending on the real application, the calliper head 86 may have another shape. e.g. prismatic, or it can comprise measuring points or measuring edges in place of the plain measuring surfaces 90a and 90b.

The movable coupling between the first portion 83 and the second portion 84 of the calliper body 82 is realized by means of resiliently deformable connecting members extending with reference to the measuring directions, i.e. with reference to the measuring surfaces 90a and 90b, at an angle of 45°. In the present example, two connecting members 91 and 92 are provided forming part of the calliper body 82, which itself is made of one piece, i.e. the potions 83 and 84 consist of one and the same body The subdivision into the two portions 83 and 84 is accomplished by the fact that a plurality of slots 93a to 93c as well as 94 are provided separating the two portions 83 and 84 from each other.

As can be clearly seen in FIG. 5, the calliper body 82 has a side surface 95 which extends at an angle of 45° with reference to the measuring surfaces 90a and 90b; such arrangement provides for that a further measuring surface 90d is freely accessible. Parallely to this side surface 95, this is to say, at an angle of 45° as well, a slot 93c is provided at a small distance from the side surface 95; thereby a first connecting member 92 to formed. This first connecting member 92 is established by the remaining material land of the calliper body 82 connecting the first portion 83 to the second portion 84.

The slot 93c merges via a perpendicularly arranged slot 93b (which itself extends at an angle of 45° with reference to the measuring surfaces 90a and 90b again) in a slot 93a perpendicularly arranged with reference to the last-named slot 93b and which thereby is parallel to the slot 93c, however has a certain distance thereto. Finally, parallely arranged to that slot 93a, in a small distance, a further slot 94 is provided extending up to the edge of the calliper body 82, so that a material land remains between said slot 94 and the slot 93a forming the other connecting member 91.

It is essential, as will be further explained hereinafter, that the lands 91 and 92 serving as connecting members extend exactly at an angle of 45° with reference to the measuring surfaces 90a and 90b. On the other hand, it is not of paramount importance for the connecting members 91 and 92 to be one-piece parts of the calliper body 82; it is also possible, with the same result, to provide the portions 83 and 84 of the calliper body 82 as individually machined, separate parts connected to each other by means of two leaf springs (not shown). These have the same function as the material lands 91 and 92 whereby, however, attention must be paid to the fact that the longitudinal extension of the leaf springs is at an angle of 45° with reference to the measuring surfaces 90a and 90b as long as the calliper head 86 is in its rest position.

If now (according to FIG. 6) a force acts on the measuring surface 90a in the direction of arrow $P_1$, the surface 90a has generally the attempt to linearly displace in the direction of the arrow $P_1$ as well. Since the first portion 83 of the calliper body 82 and thereby the calliper head 86 is pivotally connected to the second portion 84 of the calliper body 82, the calliper head 86 will be forced to move in the direction of the arrow $P_1$ as well as, simultaneously, in the direction of the arrow $P_2$. The reason therefore is that the first movable portion 83 is displaceably connected to the second, immovable portion 84 by means of the two lands 91 and 92 (or, alternatively, by means of the two aforementioned, not shown leaf springs) extending at an angle of 45° with reference to the measuring direction. Thereby, a sort of (imaginary) pivoting axes are established at the crossover points of the lands 91 and 92 to the second portion 84, i.e. at the points X and Y (FIG. 6), around which the first portion 83 pivots.

Figure 6:
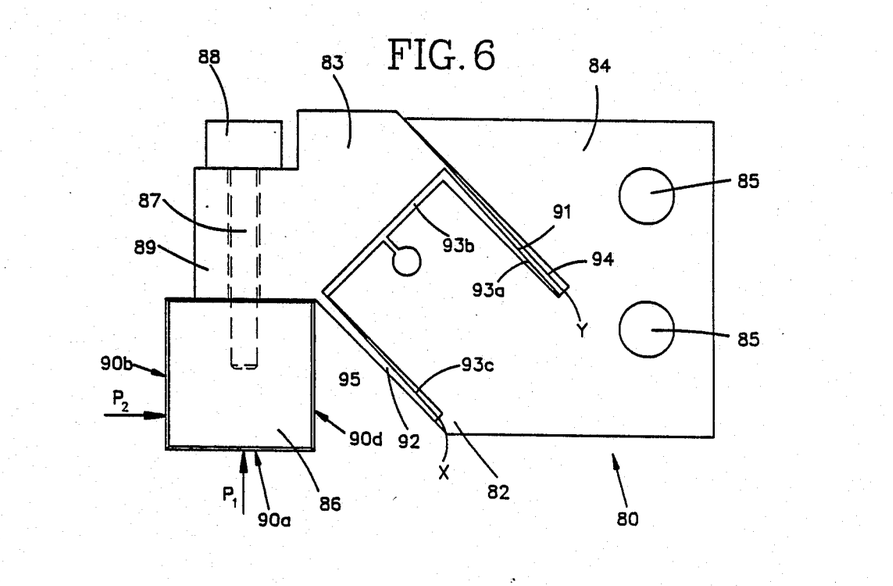
FIG. 6 shows an enlarged side view of the measuring calliper used in the measuring apparatus according to the invention, in a position in which a measuring force is applied thereto.

In FIG. 6, the maximally possible displacement position of the calliper head 86, under the influence of a force $P_1$, is shown. One can see that the left hand ends of the slots 94 and 93c are closed while the left hand end of the slot 93a has fully opened. Thus, a stop is provided by the two left hand ends of the lands 91 and 92 abutting against the adjacent calliper body walls preventing a further displacement of the portion 83.

In practice, the maximal displacement path of the calliper head 86 with reference to the immovable portion 84 of the calliper body 82 is in the region of fractions of a millimeter; this is sufficient since the calliper is used for precision measurements related to a reference position rather than for absolute positional measurements. This is also the reason why the theoretically present inaccuracy occurring during the deformation of the lands 91 and 92 is of no further importance since the displacement path of the head 86 is very short.

Exactly the same happens if a measuring force acts on the measuring surface 90b in the direction of arrow $P_2$. Despite the fact that the calliper head 86 theoretically attempts to displace in the direction of the measuring force, it will be forced, as previously explained, to a diagonal motion between the arrows $P_1$ and $P_2$. Thereby, the desired result is achieved, i.e. utilizing a single measuring apparatus, e.g. a measuring gauge 72 according to FIG. 2, to determine a displacement of the calliper head 86 in two perpendicular directions (e.g. in the direction of arrow $P_1$ and in the direction of arrow $P_2$).

Astonishingly, the same is true not only if a measuring force acts on the calliper head 86 in the two aforementioned perpendicular directions, but also for any measuring force acting on the calliper head 86 in an arbitrary direction between said two perpendicular measuring directions. With other words, any measuring force whose direction lies within the sector between $P_1$ and $P_2$ causes a directionally identical displacement of the calliper head 86 with regard to the rigid portion 84.

The point where the sensor of the measuring apparatus, e.g. the stylus of the measuring gauge 72, contacts the measuring calliper 80 is generally not critical as long as it is an exactly plain surface which extends in an exactly defined angular position with reference to the measuring directions. It appears most useful to machine the head of the screw 88 fixing the calliper head 84 to the portion 83 exactly plain and to have the stylus impinge the top surface of the screw 88.

Figure 7:
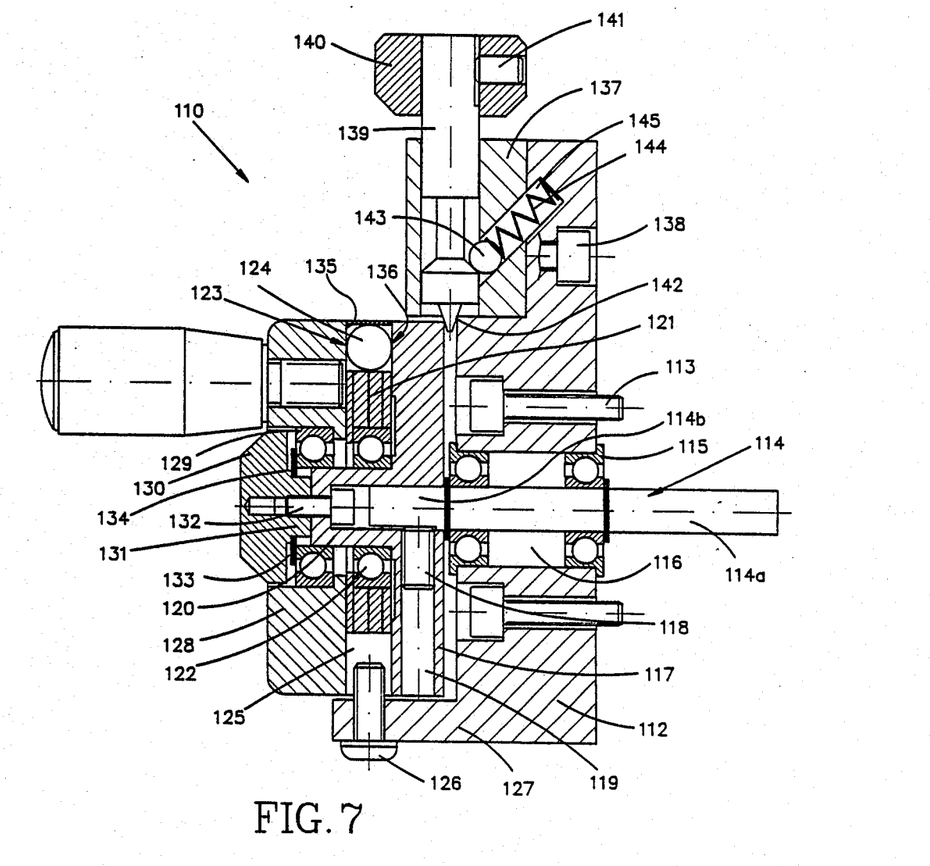
FIG. 7 shows a vertical sectional view of the driving means.

Referring now to FIG. 7 showing a cross sectional view of the driving means 45 and 61, respectively, the design and function thereof shall be further explained hereinafter.

The essential part of the driving means 45 and 61, respectively, is a reversing gear assembly, generally designated with reference numeral 110. It comprises a gear assembly housing 112 fixed to the measuring carriage 43 or to the head portion 44 by means of screws 113. The housing 112 contains a driven shaft 114 rotatably mounted in the housing 112 by means of two ball bearings 115 inserted in a core 116 of the gear assembly housing 112 distantly to each other. One end portion 114a of the driven shaft 114 protrudes outwards from the housing 112 and bears e.g. a friction wheel (not shown), the other free end portion 114b of the driven shaft is provided with a driven member 117. The latter one is torsionally fixedly mounted on the end portion 114b by means of a set screw 118 received in a threaded radial bore 119 provided in the driven member 117.

The driven member 117 generally has the shape of a circular disc and is provided with a central hub-like extension 120 projecting from the disc-like driven member 117 on the surface opposite to the two ball bearings 115. A ball cage in the shape of a circular cage disc 121 is rotatably mounted on the extension 120 by means of a ball bearing 122. The ball cage 121 comprises three circular openings 123 extending parallely to the central axis of the disc 121 and equidistantially arranged close to the periphery of the cage disc 121. These openings 123 each receive a ball 124 which roll off on the driven member 117 as will be further explained hereinafter in full detail. The diameter of the openings 123 correspond approximately to the diameter of the balls 124 or is somewhat greater in order to enable the balls 124 to freely rotate within the openings 123. The thickness of the cage disc 121 is somewhat less than the diameter of the balls 124 such that the balls 124, when inserted into the openings 123, somewhat project from the two opposite surface planes of the cage disc 121. Preferably, the cage disc 121 may be manufactured of a plastic material having a low friction coefficient with regard to polished steel, i.e. the material the balls are manufactured of. The balls 124 may be quite common balls as they are used in ball bearings; they are commercially available in many sizes. Furthermore, the cage disc 121 is provided with a peripherally located recess 125. A locking pin 126 mounted on an extension 127 of the gear assembly housing 112 engages the recess 125 and thereby prevents the cage disc 121 from rotating. With other words, the cage disc 121 stops when the driven shaft 114 and thereby the driven member 117 rotates.

The gear assembly 110 further comprises a driving member 46 and 62, respectively, rotatably mounted on the extension 120 of the driven member 117 by means of a ball bearing 129 received in a central circular opening of the generally disc-shaped driving member 46 and 60, respectively. The inner ball race of the ball bearing 129 slidingly fits the outer surface of the extension 120 so that the driving member 46 and 62, respectively, may be axially displaced. To retain the driving member 46 and 62, respectively, a retaining member 130 is provided having an outer diameter which is somewhat less than the diameter of the central opening of the driving member 46 and 62, respectively, and comprising a central extension 131 projecting towards the extension 120 of the driven member 117. The retaining member 130 is torsionally fixedly mounted on the extension 120 of the driven member 117 by means of a screw 132.

A cup spring 133 is pushed over the extension 131 of the retaining member 130 and abuts along its inner edge against a collar 134 provided at the base portion of the extension 131. The outer edge of the cup spring 133 engages the outer front face of the inner ball race of the ball bearing 129 which protrudes over the front face of the extension 120.

The surface of the driven member 117 directed towards the driving member 46 and 62, respectively, and the surface of the driving member 46 and 62, respectively, directed towards the driven member 117 both comprise plainly machined driving surface portions 135 and 136, respectively, which serve as races for the balls 124 rolling off thereon. The surface portions 135 and 136 usually have annular shape and are plainly ground and, if appropriate, hardened and polished. The gear assembly being assembled, as shown in FIG. 7, the cup spring 133 is biased and its outer edge exerts an axial force against the inner ball race of the ball bearing 129 and thereby against the driving member 46 and 62, respectively, directed towards the driven member 117. The result is that the balls 124 are sandwiched between the driving surface portion 135 of the driving member 46 and 62, respectively, and the driving surface portion 136 of the driven member 117.

A bush 137 is mounted on an upper portion of the gear assembly housing 112, e.g. by means of screws 139, receiving a driving spindle 139 with an auxiliary driving wheel 48 and 64, respectively, attached to its end and fixed thereto by means of a set screw 141. The driving spindle 139 is rotatable and axially displaceable with regard to the bush 137 and comprises a tapered end portion 142 engaging a peripheral edge of the driven member 117 in the position as shown in FIG. 7, i.e. with actuated driving spindle 139. An obliquely extending blind bore 145 is provided in the bush 137, containing a pressure spring 144 and a ball 143. The spindle 139 has a surface portion 146 with the shape of a cone jacket. The ball 143 is pressed against said surface portion 143 under the influence of the spring 144 such that the spindle 139 is axially displaced and its tapered end portion 142 pressed against said peripheral edge of the driven member 117. The driving spindle 139 can be disengaged by pulling the auxiliary driving wheel 48 and 64, respectively, upwardly so that the tapered end portion 142 is released from said peripheral edge of the driven member 117.

The operation of the driving means hereinbefore described is as follows: It is assumed that the driving spindle 139 is disengaged for the time being. The driving member 46 and 62, respectively, is driven to a rotation by means of the driving pin 47 and 63, respectively. As the driving member 46 and 62, respectively, is pressed against the balls 124 under the influence of the cup spring 133, the balls 124 are driven to a rotational movement around (imaginary) radially extending axes since they roll off on the driving surface portion 135 of the driving member 46 and 62, respectively. The cage disc 121 does not rotate because the locking pin 126 engages the recess 125 and prevents the cage disc 121 from a rotation. The rotating balls 124 driven by the driving member 46 and 62, respectively, roll off with their opposite side on the driving surface portion 136 of the driven member 117 and drive the latter to a rotational movement in a sense opposite to the rotation sense of the driving member 46 and 62, respectively, with said first, higher speed. Thus, the driven shaft 114 torsionally fixedly connected to the driven member 117 is rotated as well.

In order to drive the driven member 117 to said second, lower speed, the driving spindle 139 is brought into its engaged position as shown in FIG. 7 whereby the tapered end portion 142 is pressed against said peripheral edge of the driven member 117 under the influence of the spring-loaded ball 143. Upon rotation of the auxiliary driving wheel 48 and 64, respectively, the jacket surface of the tapered end portion 142 of the driving spindle 139 rolls off along said peripheral edge of the driven member 117 and drives the latter to a slow rotation. Due to the difference of the diameters (very small effective diameter of the tapered end portion 142 and large diameter of the peripheral edge of the driven member 117), a low transmission ratio results so that the driven member 117 may be finely adjusted with regard to its rotational position.

Under the influence of the cup spring 133 which presses the driving member 46 and 62, respectively, towards the balls 124 and the latter ones towards the driven member 117, any clearance is removed. Nevertheless, the gear assembly runs freely since the balls 124 have but a very low friction in the cage disc 121 and roll off on the surface portions 135 and 136 essentially without significant friction. A lubrication of the balls 124 or the cage disc 121 or the surface portions 135 and 136 is not required so that an essentially service free yet precise operation of the gear assembly is ensured during an extended period of time.

Due to constructional reasons, the frictional driving means in the form of the end portion 114a of the shaft 114 can engage the displaceable measuring rail 60 only at its upper edge so that an illogical adjusting procedure of the measuring rail 60 would result. If the end portion 114a of the shaft 114 is rotated clockwise, the measuring rail 60 is displaced towards the left, and vice versa.

The driving means hereinbefore described solves this problem. If the driving member 62 is rotated clockwise by means of the driving pin 63, the driven member 117 and thus the driving shaft 114 will rotate in counterclockwise sense so that the measuring rail 60 is logically correctly displaced towards the right. In order to coarsly adjust the measuring rail 60 close to its desired position, the driving spindle 139 is disengaged by pulling out the auxiliary driving wheel 64, and the driving wheel 62 is rotated accordingly. Now the auxiliary driving wheel 64 is pushed in to engage the tapered end portion 142 of the driving spindle 139 with the outer peripheral edge of the driven member 117. By rotating the auxiliary driving wheel 64 in clockwise sense the measuring rail 60 will slowly move to the right, because a rotation sense inversion will be effected by the cooperation of the driving spindle 139 and the driven member 117. Correspondingly, the same is true for the height adjustment of the measuring carriage 4. Thus, the measuring apparatus according to the present invention may be adjusted very precisely and sensitively thanks to the driving means described hereinabove which have no clearance and very low friction.

Referring now to FIGS. 8 to 11 showing several detailed views of the locking means 50, the design and function thereof shall be further explained hereinafter.

Figure 8:
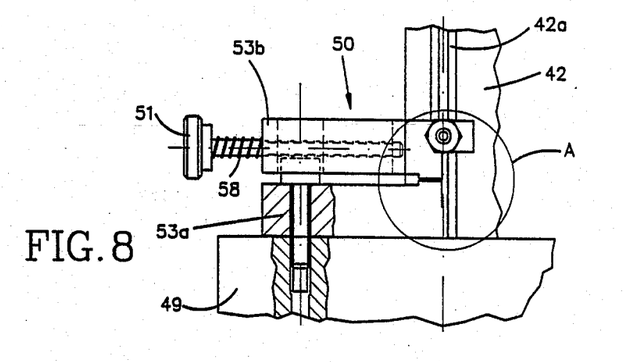
FIG. 8 shows a partially sectioned side view of the locking means.
Figure 9:
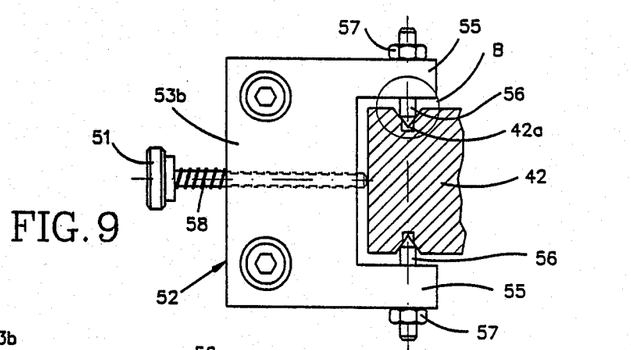
FIG. 9 shows a top view of the locking means of FIG. 8.

As can be seen in FIGS. 8 and 9, the locking means 50 comprises a locking yoke 53 including a lower yoke member 53a and an upper yoke member 53b. Both yoke members 53a and 53b have plate-like shape and are arranged parallely to each other in close distance. The two plate-like members 53a and 53b are connected to each other by means of a blade-like connecting member. In the present example, the blade-like connecting member consists of a thin material land 54 which is an integrated part of the two yoke members 53a and 53b. The lower yoke member 53a is rigidly connected to the carriage housing 49 and extends perpendicularly to the guiding rail 42. The upper yoke member 53b extending perpendicularly to the guiding rail 42 as well and located parallely and closely above the lower yoke member 53a comprises two extensions 55 arranged in the region of two adjacent edges thereof and overlapping the side edges of the guiding rail 42 with the V-shaped guiding grooves 42a formed therein.

Both extensions 55 are equipped with threaded locking pins 56 received in correspondingly threaded bores provided in the extensions 55. The free end of each locking pin 56 remote from the grooves 42a bears a lock nut 57 preventing the locking pins 56 from being wrongly adjusted by error. The other end of the locking pins 56 is tapered and projects into the related V-shaped guiding groove 42a. The upper yoke member 53b of the locking yoke 53 is provided with a locking screw 58, the frontal face thereof abuting against the adjoining frontal surface of the guiding rail 42 upon tightening the locking screw 58.

Figures 10, 11:
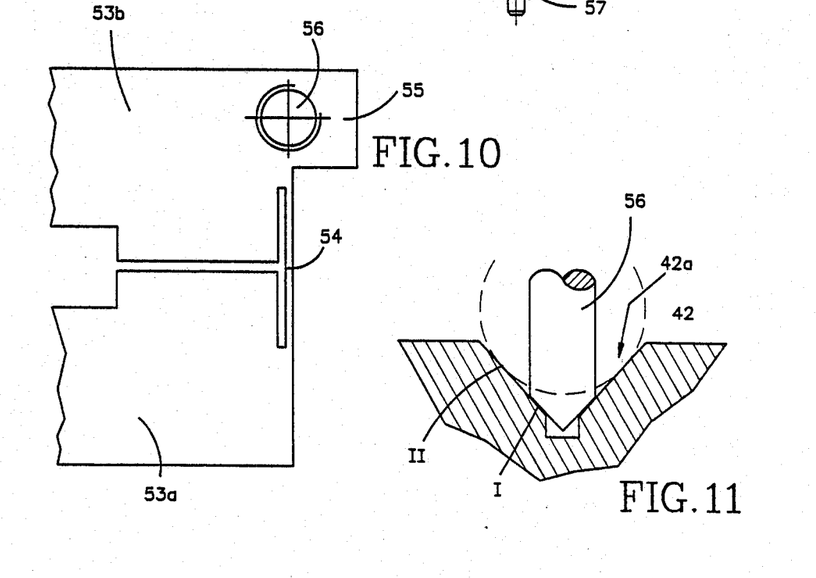
FIG. 10 shows the detail A indicated in FIG. 8.
FIG. 11 shows the detail B indicated in FIG. 9.

By the provision of a blade-like connecting member, the upper yoke member 53b is displaceable with regard to the lower yoke member 53a within the plate plane in a direction perpendicular to the guiding rail 42, but no in the direction of extension of the guiding rail 42. The reason therefor is that the material land 54 may be resiliently bent, but is rigid in its longitudinal direction. The said rigidity is additionally supported by the fact that the axes of the locking pins 56 exactly lie in the enlarged central plane of the material land 54 (FIG. 10).

The operation of the locking means 50 is as follows: In the unlocked normal position the locking screw 58 is released and the two locking pins are adjusted such that their tapered end portions project into the V-shaped grooves 42a with a small clearance, but without touching the walls of the grooves 42a. Thus, the measuring carriage 43 can be moved up and down without being hindered. In order to lock the movement of the measuring carriage 43, the locking screw 58 is tightened, its frontal face abuts against the frontal face of the guiding rail 42 and the upper yoke member 53b of the locking yoke 53 is forced to a displacement away from the guiding rail 42 whereby the material land 54 is resiliently distorted. However the amount of such deformation is very low, approximately in the region of fractions of a millimeter. Thereby, the tapered end portions of the locking pins 56 abut against the walls of the V-shaped grooves 42a and prevent the measuring carriage 43 from further being movable. The transmission of the locking force takes place from the upper yoke member 53b via the material land 54 to the lower yoke member 53a of the locking yoke 53. Since the material land 54 is rigid in its longitudinal direction, as previously mentioned, a safe and immovable locking is ensured.

In order to make sure that the walls of the V-shaped grooves 42a on which the balls of the linear ball bearing roll off are not damaged, the tapered end portions of the locking pins 56 have such a slender shape that they abut against the walls of the V-shaped grooves 42a in a region of the walls not touched by the balls. It is clearly evident from FIG. 11 that the locking pins 56 touch the walls 59 of the groove 42a in a region I which is much closer to the groove ground than the region II on which the balls roll off.

Figure 3:
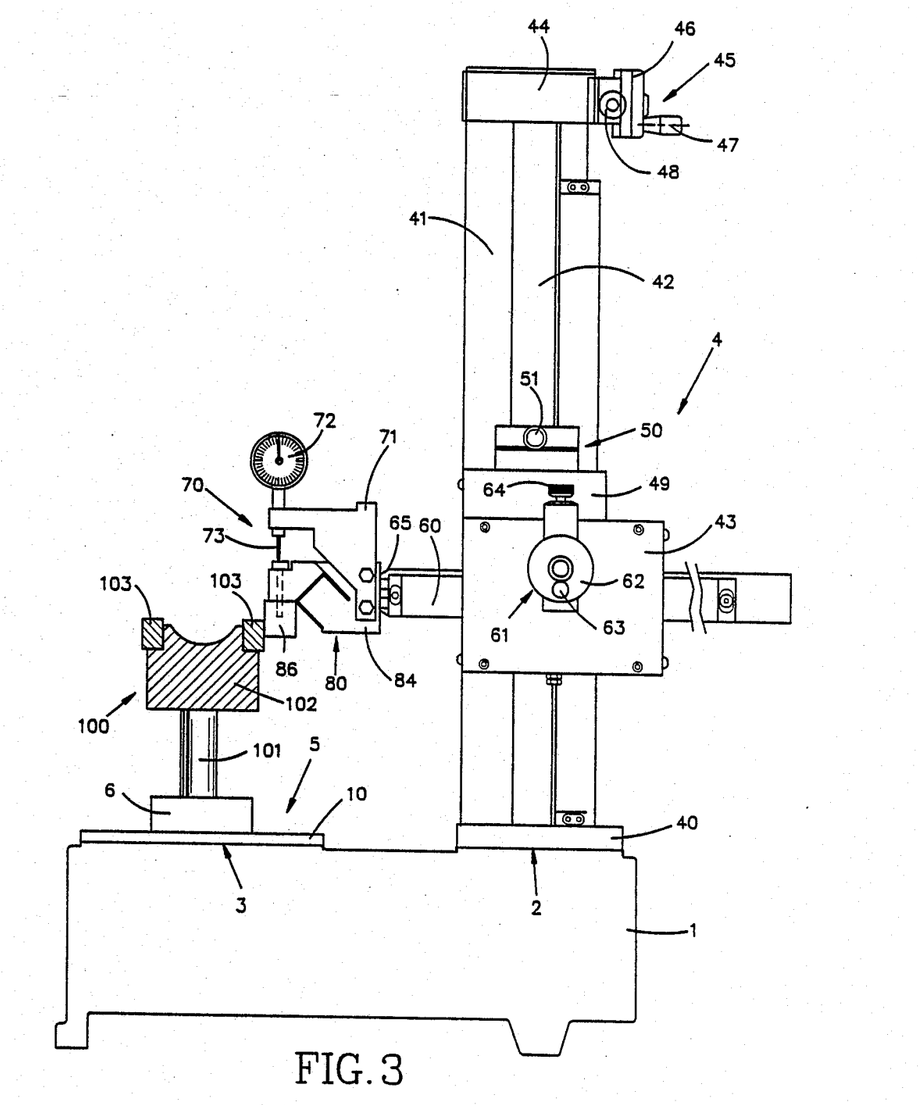
FIG. 3 shows a view similar to the one in FIG. 2, but with a measuring object fixed in the measuring object receiving means, during a first measurement step.
Figure 4:
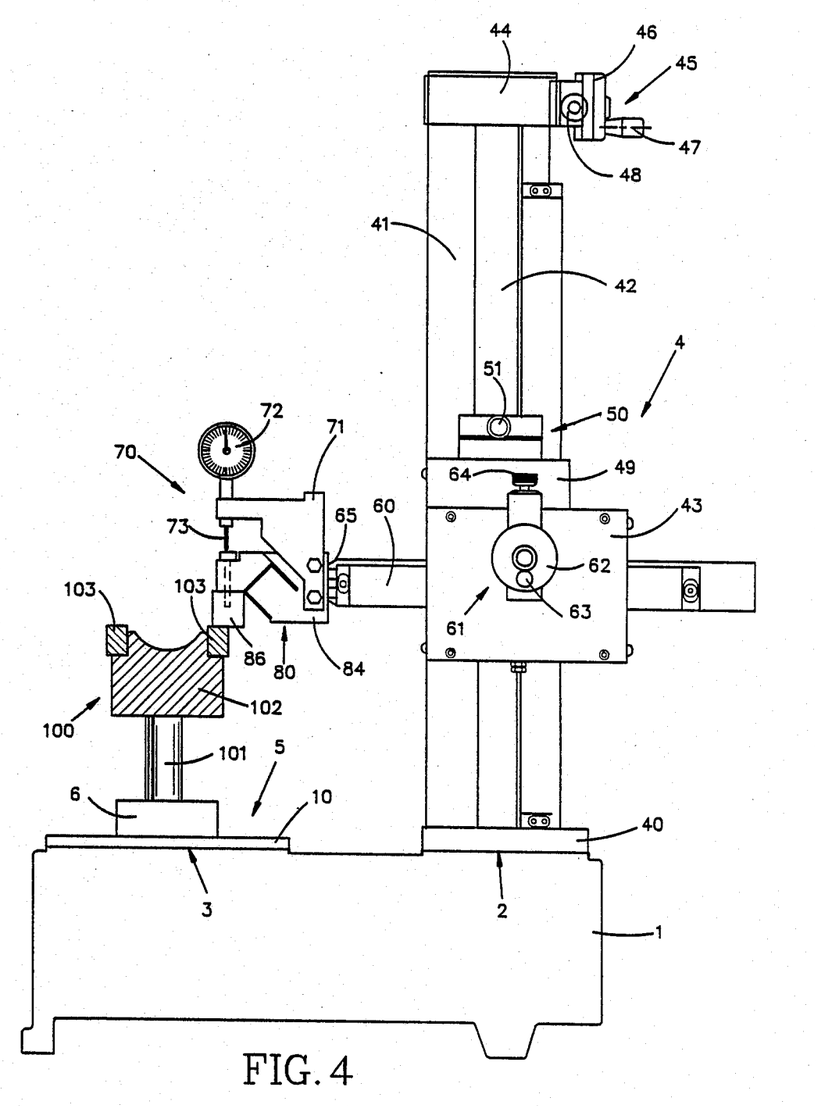
FIG. 4 shows a view similar to the one in FIG. 3, during a second measurement step.

With reference to FIGS. 3 and 4, the measuring of a tool will be further explained hereinbelow, as an example with is representative for many other applications of the measuring apparatus of the present invention. A milling cutter 100 comprises a shaft 101 equipped with a cutter head 102 which bears a plurality of cutting plates 103. The shaft 101 is rotatably received in the measuring object receiving means 5, for instance directly in the sleeve 6 (FIG. 1). In order to determine the effective diameter of the cutter head 102, the measuring carriage 43 is displaced into such a height position in which the calliper head 86 may be brought into a position where it touches the edge of one of the cutting plates 103. Now the measuring carriage 43 is locked by engaging the locking means 50 in order to prevent the carriage 43 from being further displaced by error. The next step is to displace the measuring rail 60 towards the cutter head 102 until the calliper head 86 touches the edge of the cutting plate 103. As previously mentioned, the measuring rail 60 will be displaced to the left, in a first approach, by operating the driving wheel 62 while the spindle 139 (FIG. 7) is disengaged, and thereafter the auxiliary driving wheel 64 is pushed in to engage the spindle 139 with the peripheral edge of the driven member 117 (FIG. 7) to finely further displace the measuring rail 60 by slowly rotating the auxiliary driving wheel 64. Finally a position of the measuring rail 60 will be found in which the gauge 72 indicates the value "0" corresponding exactly to a well defined nominal position of the calliper head 86.

In this connection it should be pointed out that the measuring apparatus according to the invention has to be calibrated before it can be put into operation e.g. to determine the size of objects. Such calibration is performed only once prior to the initial operation of the apparatus or every time when the calliper assembly 80 has been readjusted or replaced. For this purpose, e.g. a calibration mandrel may be used having known dimensions with regard to its height and diameter and which may be put into the measuring object receiving means 5. When the calliper head 86 touches the surface of the calibration mandrel and the position of the measuring rail is adjusted such to get a value "0" of the gauge 72, a reference value of the displacement path of the measuring rail 60 is fixed which serving as a calculating base value during all subsequent measurements. The same is correspondingly true with regard to the height position: The calliper head 86 is displaced towards the upper frontal face of the calibration mandrel by lowering the measuring carriage 43 down to the position where the lower measuring surface of the calliper head 86 touches the frontal surface of the calibration mandrel and the gauge 72 indicates the value "0". Thereby a reference value for the height position of the measuring carriage 43 is fixed.

Reverting again to the example according to FIG. 3, the determined value of the displacement path of the measuring rail 60 at the value "0" indication of the gauge will be put into relation with the known reference value and therefrom the effective diameter of the cutter head is calculated. In a similar manner the rotational accuracy of the milling cutter 100 may be checked by rotating the cutter 100 in the measuring object receiving means 5 into several different positions and measuring the effective diameter at several points along the periphery of the cutter head 102.

In the example according to FIG. 4 the effective height of the milling cutter 100 has to be measured. For this purpose, starting with the situation according to FIG. 3, the measuring rail 60 will be displaced somewhat to the right, the locking means 50 released, the measuring carriage 43 is moved upwardly to such an extent that the calliper head 86 is higher than the cutting plate 103 to be measured, the measuring rail 60 is displaced back to the left again to locate the lower measuring surface of the calliper head directly above the upper edge of the cutting plate to be measured, an eventually provided locking means for locking the displacement of the measuring rail 60 is activated, and finally the measuring carriage 43 is lowered until the calliper head 86 touches the upper edge of the cutting plate to be measured. It remains to finely adjust the height position of the measuring carriage 43 to get a value "0" on the gauge 72. Now the value of the actual height position of the measuring carriage 43 is put into relation with the known reference value in order to calculate the real, effective height dimension of the milling cutter 100. As previously mentioned, the cutter 100 may be rotated as well in order to take several measurements, e.g. to measure the height of several cutting plates 103.

It is evident that the entire measuring calliper assembly 70 is identical in FIGS. 3 and 4 despite the fact that two different dimensions, perpendicular to each other, could be determined. The reason is that the displacement of the calliper head 86 with regard to the rigid portion 84 of the measuring calliper 80 always remains the same as far as the absolute value and the direction is concerned, independently whether the measurement is taken by means of the frontal measuring surface 90b or by means of the lower measuring surface 90a. Even obliquely extending surfaces of an object can be measured in this manner since there is no deviation in the measurement result if the measuring force acts in an arbitrary angle between the two previously mentioned directions (i.e. horizontally and vertically). Thus, the present invention provides a measuring apparatus by means of which two measurement directions extending perpendicularly to each other as well as any measurement direction extending therebetween may be monitored and any change determined without the need to constructionally redesign or readjust the measurement apparatus. Particularly, it is easily possible to determine any variation of the shape of a work piece and the exact location where this variation takes place with the same measuring apparatus without any changing, e.g. to positionally determine the transition point of the tapered end portion of a spiral drill to the cylindric drill portion, or the angle and the evenness of a conical recess in a work piece.

Especially if the actual position of the measuring rail and the measuring carriage is electrically or electronically determined, a very comfortable, quick and precise operation is possible. Preferably, an electronic control unit may be used which stores the initially determined reference values and automatically puts the stored values into relation with the determined actual position values of the measuring rail and the measuring carriage in order to directly display the calculated measurement value. With such a control unit it is further possible to store different reference values as well as correction values, e.g. values related to a certain machining apparatus. If a certain tool has to be used with different machining apparatus, the tool is measured by means of the measuring apparatus hereinbefore described prior to its insertion into the machining apparatus whereby the stored individual reference and correction values belonging to a certain machining apparatus may be recalled and used for measuring the tool to be used in that machining apparatus. The displayed measurement values may then be entered directly into the machining apparatus as correction values to be taken into account during operation of the machining apparatus.

What I claim is:

1. A measuring apparatus to determine the dimensions of an object in three dimensions, the apparatus comprising
   a base plate member;
   object receiving means mounted on said base plate member adapted to rotatably but axially and radially immovably fix an object to be measured;
   a measuring carriage assembly mounted on said base plate member distantly to said object receiving means, said measuring carriage assembly including a guiding column projecting from said base plate member and extending in a first direction, and a measuring carriage slidably mounted on said guiding column to be movable along said guiding column;
   a measuring rail slidably mounted on said measuring carriage to be movable in a second direction perpendicular to said first direction;
   first driving means provided on said guiding column and adapted to drive said measuring carriage to a movement along said guiding column in said first direction, and second driving means provided on said measuring carriage and adapted to drive said guiding rail to a linear movement in said second direction;
   measuring calliper means mounted on said measuring rail at one end thereof;
   locking means provided on said measuring carriage and adapted to lock the movement of said measuring carriage along said guiding column to fix said measuring carriage in an arbitrary position on said guiding column;
   said first and second driving means each provided with a rotatable driving member, with a reversing gear assembly coaxially mounted and operatively coupled to said driving member, and with a driven member coaxially mounted and operatively coupled to said reversing gear assembly to drive said driven member to a first speed, said first and second driving means each including auxiliary driving member means engagable with said driving member to directly drive said driven member to a second speed lower than said first speed;

said measuring calliper means including a measuring calliper with a calliper body and a calliper head mounted on said calliper body and displaceable with regard to said calliper body, said calliper head being connected to said calliper body such that any constant measuring force acting on said calliper head in an arbitrary direction between and including said first and said second directions results in a displacement of said calliper head with regard to said calliper body with identical value and direction, and said measuring calliper means further including position detecting means adapted to display the position of said calliper head with regard to said calliper body.

2. A measuring apparatus according to claim 1, in which said driving member and said driven member each comprise driving surface areas provided at opposite surfaces distantly to each other and extending perpendicularly to the axes of rotation of said driving member and said driven member, and in which said reversing gear assembly comprises at least two balls guided by a cage and rolling off on said driving surface areas, whereby at least one of said driving member and said driven member is slidingly mounted in axial direction, and whereby a spring means is provided pressing one of said driving member and said driven member towards the other one.

3. A measuring apparatus according to claim 2, in which said driving member and said driven member each comprise a cylindric disc shaped body portion, the oppositely located surfaces thereof provided with said driving surface areas with annular shape.

4. A measuring apparatus according to claim 2 or 3, in which said cage for guiding said balls is constituted by a circular disc made of plastic material and inserted between said driving member and said driven member, said disc provided with at least two bores to receive said balls extending parallel to the axis of the disc and arranged close to the periphery thereof.

5. A measuring apparatus according to claim 1, in which said measuring carriage is mounted on said guiding column by means of linear ball bearings, the balls thereof rolling off in V-shaped grooves provided in two opposite longitudinal edges of said guiding column, and in which said locking means include a locking yoke having a first yoke portion of plate like design rigidly connected to the housing of said measuring carriage and extending essentially perpendicular to said first direction, and a second yoke portion parallely arranged to said first yoke portion in close distance, said second yoke portion comprising two extensions overlapping said two opposite V-shaped grooves in said guiding column and provided with locking pins projecting into said V-shaped grooves, said second yoke portion connected to said first yoke portion such to be displaceable perpendicular to said first direction but immovable in said first direction.

6. A measuring apparatus according to claim 5, in which said second yoke portion comprises a locking screw which displaces said second yoke portion with regard to said first yoke portion in said direction perpendicular to said first direction.

7. A measuring apparatus according to claim 5, in which a blade like connecting member is provided extending in said first direction and connecting said second yoke portion to said first yoke portion.

8. A measuring apparatus according to claim 7, in which said connecting member is a thin material land extending from said first yoke member to said second yoke member and being integrally formed on said first and second yoke members.

9. A measuring apparatus according to claim 5, in which said locking pins are threaded pins penetrating said extensions having tapered end portions directed towards said V-shaped grooves and bearing lock nuts on the other ends opposite to said tapered end portions.

10. A measuring apparatus according to claim 9, in which said tapered end portions are of such slim shape that they engage the side walls of said V-shaped nuts in a region which is not touched by said balls of said linear ball bearing upon displacement of said second yoke portion with regard to said first yoke portion perpendicular to said first direction.

11. A measuring apparatus according to claim 5 or 7, in which the central axes of said locking pin are located in the enlarged plane in which said blade like connecting member extends.

12. A measuring apparatus according to claim 1, further comprising second locking means provided on said measuring carriage and adapted to lock the movement of said measuring rail to fix said measuring rail in an arbitrary position with regard to said measuring carriage.

13. A measuring apparatus according to claim 1 or 12, in which said measuring rail is mounted on said measuring carriage by means of linear ball bearings, the balls thereof rolling off in V-shaped grooves provided in two opposite longitudinal edges of said measuring rail, and in which said second locking means include a locking yoke having a first yoke portion of plate like design rigidly connected to the housing of said measuring carriage and extending essentially perpendicular to said second direction, and a second yoke portion parallely arranged to said first yoke portion in close distance, said second yoke portion comprising two extensions overlapping said two opposite V-shaped grooves in said measuring rail and provided with locking pins projecting into said V-shaped grooves, said second yoke portion connected to said first yoke portion such to be displaceable perpendicular to said second direction but immovable in said second direction.

14. A measuring apparatus according to claim 13, in which said second yoke portion comprises a locking screw which displaces said second yoke portion with regard to said first yoke portion in said direction perpendicular to said first direction.

15. A measuring apparatus according to claim 13, in which a blade like connecting member is provided extending in said first direction and connecting said second yoke portion to said first yoke portion.

16. A measuring apparatus according to claim 15, in which said connecting member is a thin material land extending from said first yoke member to said second yoke member and being integrally formed on said first and second yoke members.

17. A measuring apparatus according to claim 13, in which said locking pins are threaded pins penetrating said extensions having tapered end portions directed towards said V-shaped grooves and bearing lock nuts on the other ends opposite to said tapered end portions.

18. A measuring apparatus according to claim 17, in which said tapered end portions are of such slim shape that they engage the side walls of said V-shaped nuts in a region which is not touched by said balls of said linear ball bearing upon displacement of said second yoke portion with regard to said first yoke portion perpendicular to said first direction.

19. A measuring apparatus according to claims 13 or 15, in which the central axes of said locking pin are located in the enlarged plane in which said blade like connecting member extends.

20. A measuring apparatus according to claim 1, in which said calliper body includes a first body portion and a second body portion, said first and second portions being displaceable with regard to each other, whereby said calliper head is mounted on said first portion and adapted to engage the object to be measured, said second portion mounted on said measuring rail and connected to said first portion by means of at least two parallel, elastically resilient connecting members extending at an angle of 45° with regard to each of said first and second 21. A measuring apparatus according to claim 20, in which said calliper body is a one-piece construction and is subdivided into said first and second body portions by a plurality of slots provided in said calliper body, said slots extending at an angle of 45° with regard to said first and second directions.

22. A measuring apparatus according to claim 21, in which a first one of said at least two connecting members between said first and second body portions consists of a narrow land portion of said calliper body located between two parallely extending slots.

23. A measuring apparatus according to claim 21, in which a second one of said at least two connecting members between said first and second body portions consists of a narrow land portion of said calliper body located between an outer edge of said calliper body extending at an angle of 45° with regard to said first and second directions and a slot extending parallely thereto.

* * * * *

UNITED STATES PATENT AND TRADEMARK OFFICE
CERTIFICATE OF CORRECTION

PATENT NO. : 4,790,078
DATED : December 13, 1988
INVENTOR(S) : Rudolf Schneider

It is certified that error appears in the above-identified patent and that said Letters Patent is hereby corrected as shown below:

Column 18, line 2 after "second," insert --directions.--.

Signed and Sealed this

Fourth Day of July, 1989

Attest:

DONALD J. QUIGG

Attesting Officer

Commissioner of Patents and Trademarks